Dec. 12, 1950          J. B. KIRBY          2,534,171
FILTER CLEANER FOR VACUUM DUST COLLECTORS
Filed June 14, 1947          2 Sheets—Sheet 1
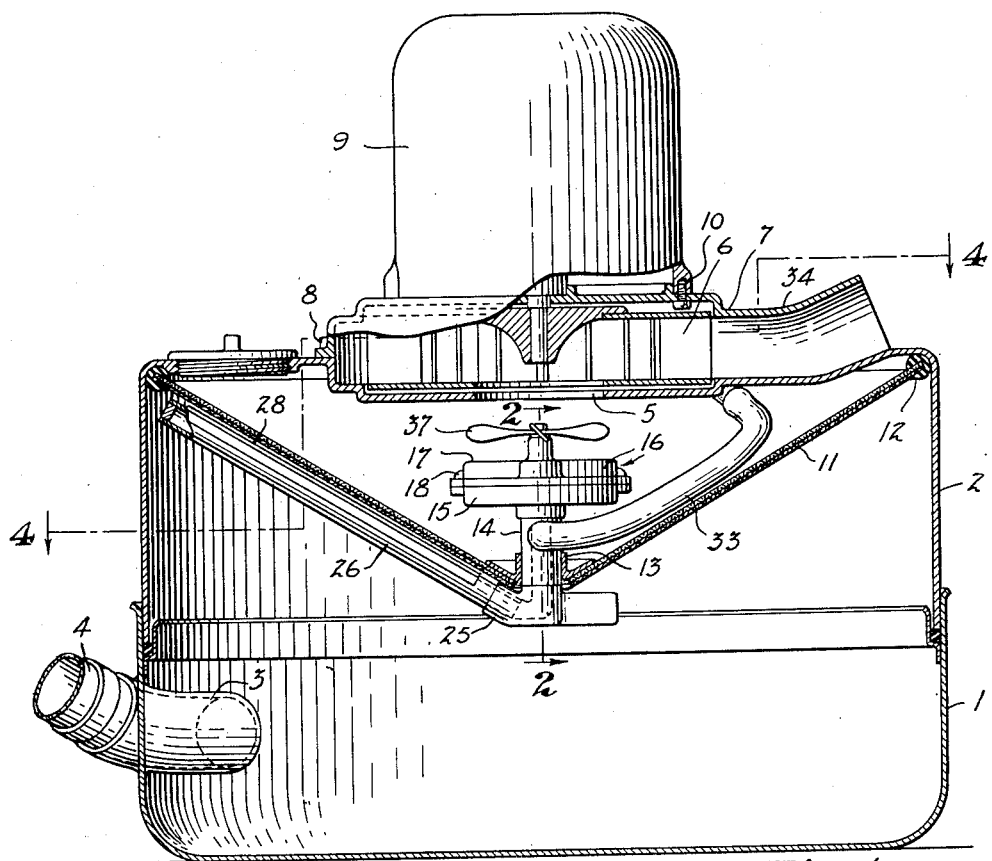
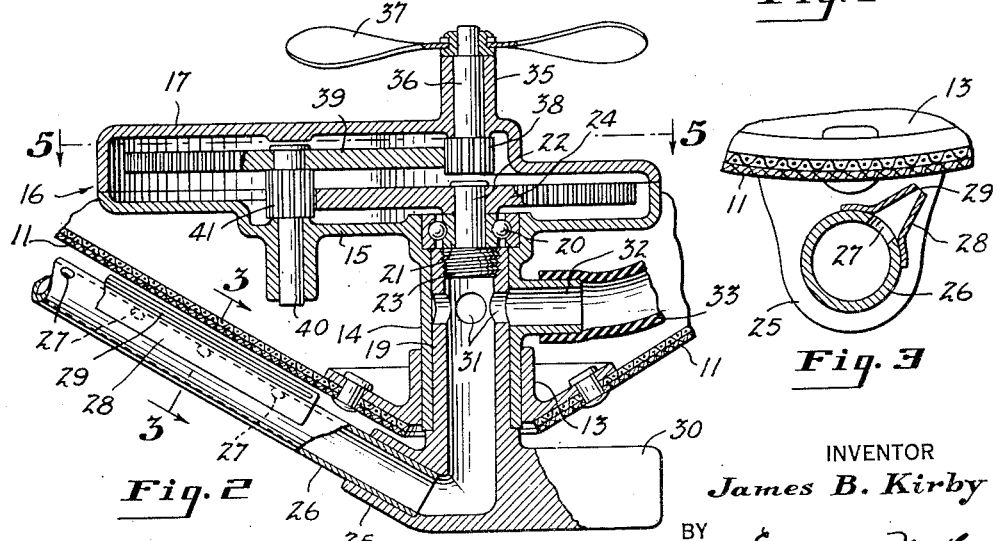
INVENTOR
James B. Kirby
BY
Evans & McCoy
ATTORNEYS Dec. 12, 1950     J. B. KIRBY     2,534,171
FILTER CLEANER FOR VACUUM DUST COLLECTORS Filed June 14, 1947     2 Sheets-Sheet 2

INVENTOR
James B. Kirby
BY Evans + McCoy
ATTORNEYS

Patented Dec. 12, 1950

2,534,171

UNITED STATES PATENT OFFICE 2,534,171

FILTER CLEANER FOR VACUUM DUST COLLECTORS

James B. Kirby, West Richfield, Ohio

Application June 14, 1947, Serial No. 754,678

10 Claims. (Cl. 183—57)

This invention relates to vacuum cleaners of the type in which a filter is interposed between a dust collecting chamber and the suction fan, and more particularly to a device for cleaning the filter.

The invention has for its object to utilize a jet of air under pressure to clean continuously the filter of a vacuum cleaner to maintain a free flow of air through the filter during operation of the suction fan.

Another object of the invention is to utilize the moving air stream in a vacuum cleaner to produce relative motion between a filter and a filter cleaner.

A further object of the invention is to clean continuously a stationary filter of a vacuum cleaner by traversing the surface of the filter with a jet of air to blow the dirt off the surface of the filter.

Another object of the invention is to arrange a suction chamber above a dust collecting inlet chamber and separated therefrom by a filter of substantial area, and to maintain the efficiency of the filter by cleaning the under surface of the same continuously during operation of the cleaner.

With the above and other objects in view, the invention may be said to comprise the filter cleaner as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a vertical central section through a vacuum tank containing a filter to which the cleaner of the present invention is applied;

Fig. 2 is a vertical section taken on the line indicated at 2—2 in Fig. 1;

Fig. 3 is a fragmentary section taken on the line indicated at 3—3 in Fig. 2;

Figure 4:
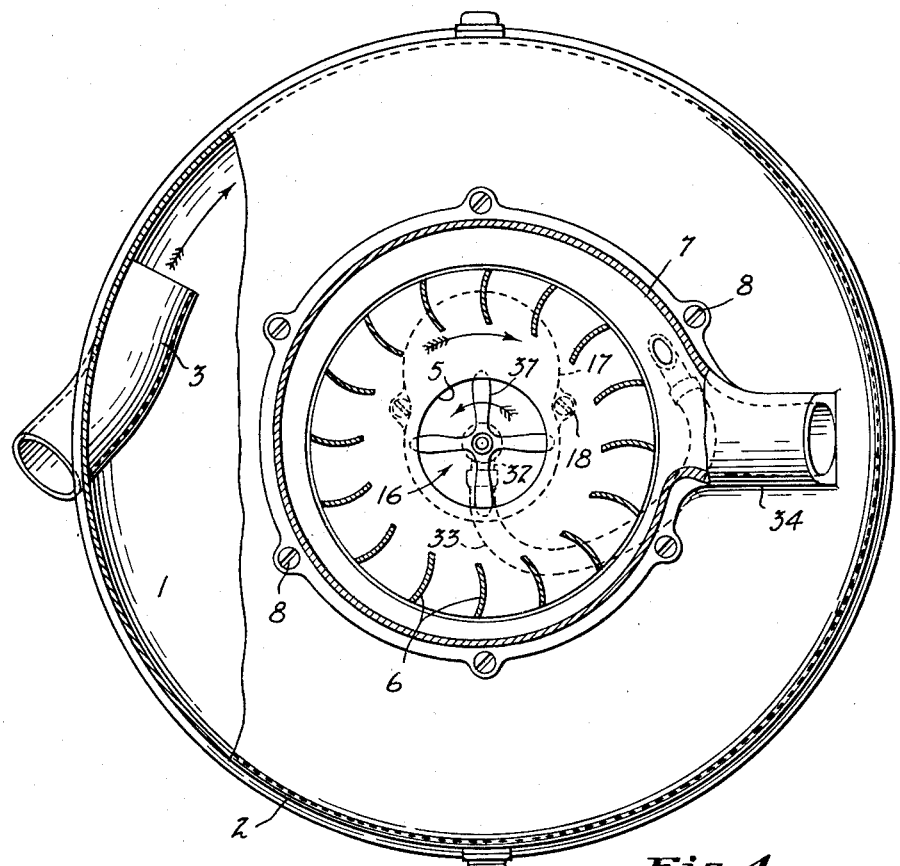
Fig. 4 is a horizontal section taken on the broken line indicated at 4—4 in Fig. 1.
Figure 5:
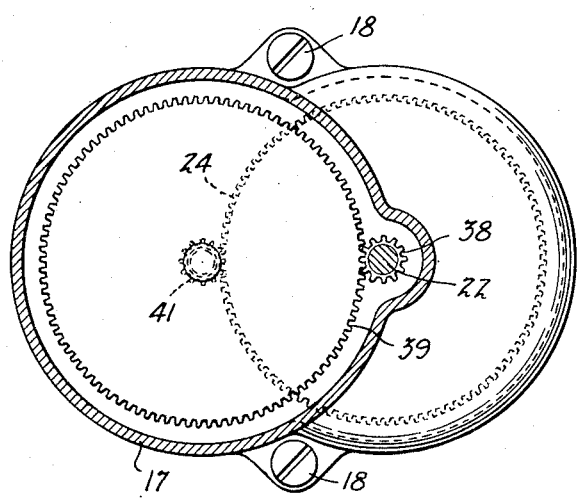
Fig. 5 is a horizontal section taken on the line indicated at 5—5 in Fig. 2.

Certain of the inventions of the present application are claimed broadly in my copending application Serial No. 709,555, filed November 13, 1946.

In the accompanying drawings the invention is shown applied to a vacuum cleaner having a tank which is divided intermediate the top and bottom to provide a lower cup-shaped section 1 which forms a dust receptacle and an upper cup-shaped section 2 which forms the cover of the tank. The peripheral walls of the two sections are telescopically joined together to form a substantially fluid tight container and the top section 2 is provided with a central opening 5 which provides an inlet to a fan 6 mounted in a suitable casing 7 attached to the top of the cover section 2 by suitable means such as bolts 8. The fan 6 is driven by a suitable motor mounted in a housing 9 attached to the top of the fan casing 7 by suitable means such as bolts 10.

Within the top section 2 and beneath the opening 5 there is mounted a conical filter 11 which is preferably formed of relatively stiff wire screen and fabric. The external periphery of the filter has a rubber rim 12 attached thereto which has a tight fit within the peripheral wall of the cover section 2 to detachably secure the filter within the cover. The filter 11 tapers downwardly and at its apex is provided with a collar 13 to which is attached a vertical bearing member 14 which forms an integral part of the bottom section 15 of a gear housing 16 which has a top section 17 attached to the bottom section 15 by suitable means such as bolts 18.

A tubular shaft 19 is journaled in the vertical bearing portion 14 of the housing and is supported by means of a ball bearing 20 mounted in the bottom section 15. The bearing 20 has an inner race 21 that is secured to a reduced extension 22 of the shaft 19 which is provided with an enlarged threaded end 23 which is screwed into the upper end of the shaft 19 and forms a plug closing the upper end of the tubular shaft 19. The inner race 21 of the ball bearing is secured between the plug 23 and a gear 24 attached to the upper end of the shaft 22. At its lower end below the filter the shaft 19 has a tubular attaching arm 25 which is inclined upwardly and to which is attached a tube 26 which extends parallel to the conical surface of the filter to adjacent the periphery of the filter. The tube 26 is closed at its outer end and has a longitudinal slot 27 extending substantially the full length thereof which opens into an elongated tapering nozzle 28, having a very narrow outlet slot throughout the length of its upper edge which is closely adjacent the filter 11.

The weight of the tube 26 is balanced by means of a short, relatively heavy arm 30 carried by the shaft 19 diametrically opposite the tube 26. Above the filter 11 the tubular shaft 19 is provided with lateral openings 31 which are circumferentially spaced and positioned to successively move across a lateral inlet 32 formed in the bearing member 14 as the shaft 19 is rotated. An air hose 33 is connected to the inlet 32 and to the fan casing 7 adjacent the outlet 34 thereof so that air under pressure is delivered from the fan to the shaft 19 and through the shaft 19 to the tube 26 and nozzle 28 to create an elongated air jet against the under surface of the filter 11. The nozzle 28 is disposed at an inclination to the surface of the filter so that the elongated air jet will sweep across the surface of the filter and dislodge from the filter surface any dust particles in its path.

During operation of the vacuum cleaner the shaft 19 is continuously rotated so that the jet nozzle 28 traverses substantially the entire surface of the filter during each revolution of the shaft. The shaft is preferably rotated in the direction in which the air stream is directed by the nozzle 28 against the filter and the surface of the filter is progressively cleaned as the nozzle 29 traverses the filter surface so that no portion of the filter can become clogged by accumulations of dust and lint. Means is provided for driving the shaft 19 to cause the nozzle 28 to traverse the filter surface and this driving means is preferably powered by a motor that is operated by air moved by the suction fan 6 and that drives the shaft 19 through suitable reduction gearing in the housing 16.

In my aforesaid copending application Serial No. 709,555, relative motion between a filter and a jet nozzle is produced by rotating the filter by the fan motor. While power may be taken from the fan motor in the instant case to rotate the jet nozzle 28 with reference to the filter, it is preferred to obtain this motion by an auxiliary impeller driven by the air stream in the cleaner. In order to decrease the speed of rotation and increase the available torque, it is also preferred to provide reduction gears between the impeller or other source of power and the rotating fan nozzle 28. It is to be understood that these two features, the use of an impeller as a source of power and the use of gearing between the impeller or other source of power and the rotating member, are also applicable to the type of cleaner disclosed in my said copending application, Serial No. 709,555.

As shown herein, the housing 16 is provided with a bearing portion 35 extending upwardly from the top thereof in axial alinement with the fan 6 and a shaft 36 is journaled in the bearing portion 35. The upper end of the shaft 36 projects above the upper end of the bearing portion 35 and carries a motor in the form of an impeller 37 which is acted upon by the air stream flowing upwardly to the fan 6 so that the shaft 36 is rotated during the operation of the cleaner. At its lower end within the housing the shaft 36 carries a pinion 38 which meshes with a gear 39 attached to a shaft 40 journaled in the lower section 13 of the housing and beneath the gear 39 the shaft 40 has a pinion 41 attached thereto which meshes with the gear 24 attached to the upper end of the extension 22 of the shaft 19. Rotation of the impeller 37 imparts rotation to the shaft 19 at a much slower rate of speed and this rotation is continuous during operation of the cleaner.

In the operation of the cleaner disclosed in this case, the dirt laden air from the suction nozzle enters the dust receptacle 1 through the tangential inlet pipe 3 to which is connected the hose 4 leading from the suction nozzle. By reason of the tangential inlet the entering air is given a whirling motion in the dust chamber below the filter 11 so that the dirt and dust carried by the air is urged by centrifugal force toward the periphery of the dust chamber and heavier particles do not strike the surface of the filter. The dust chamber is of relatively large area compared to the area of the inlet pipe 3 and likewise the filter 11 is of large area. Thus the air stream moves vertically upward and through the filter 11 at a relatively low velocity, as compared to the velocity of the air passing through the inlet pipe 3 and the hose 4, and heavier dust particles, lint, string, and the like settle readily to the bottom of the container.

After the air moves at relatively low velocity through the filter 11 it enters the opening 5 of the fan chamber and is compressed and driven forcibly outwardly through the outlet 34. In the periphery of the fan casing a positive pressure is produced and the air is driven at a very high velocity. A portion of this high velocity air under positive pressure is taken from the fan chamber at the point of maximum pressure, as illustrated in Fig. 4, and delivered to the tube 26 through the air hose 33. The air in the dust collecting chamber and around the under side of the filter 11 is at a relatively high negative pressure during operation of the cleaner because the air inlet in the suction nozzle is partially closed off by the engagement of the suction nozzle with the carpet or other article being cleaned. Thus the high velocity stream of air delivered by the hose 33 to the tube 26 under positive pressure is driven through the nozzle 28 against the under side of the filter 11 with a substantial force, which is increased by the negative pressure existing in the dust chamber 1, and acts to blow from the under side of the filter dust and other particles adhering thereto.

In the illustrated embodiment, the impeller 37 is mounted with its blades so disposed that it is rotated in a counterclockwise direction, as viewed in Fig. 4, by the stream of air entering the inlet opening 5 of the fan case, causing the tube 26 to be rotated slowly in a counterclockwise direction. Thus in the preferred embodiment the direction of movement of the tube 26 is opposite that imparted to the air within the dust chamber by the tangential inlet 3 to effectively sweep the filter surface and prevent clogging of the pores of the filter.

It is to be understood that variations and modifications of the specific devices herein shown and described for purposes of illustration, may be made without departing from the spirit of the invention.

What I claim is:

1. In a vacuum cleaner, a dust collecting chamber, a suction fan having its inlet communicating with said chamber, a filter interposed between said chamber and the inlet of said suction fan and having a surface facing said chamber against which the air impinges in flowing from the chamber to the fan and upon which dust accumulates during operation of the cleaner, an inlet conduit adapted to be connected with a cleaning nozzle opening tangentially into said dust collecting chamber so as to impart a whirling motion to air drawn into said chamber by said suction fan, a jet nozzle within said chamber mounted for rotation across the surface of said filter, said nozzle being arranged to direct an air jet against the surface of said filter facing said chamber, and means for rotating the said jet nozzle in the direction opposite that of the whirling air in said dust collecting chamber.

2. In a vacuum cleaner, a dust collecting chamber, a suction fan having an inlet and an outlet with the inlet communicating with said dust collecting chamber, a filter interposed between said chamber and the inlet of said fan and having a surface facing said chamber against which the air impinges in flowing from the chamber to the fan and upon which dust accumulates during operation of the cleaner, a filter cleaner nozzle within said chamber arranged to direct a jet of air against a portion of the surface of said filter facing said chamber, said filter and said nozzle being mounted for relative rotation so that the jet of air from the nozzle traverses the surface of the filter, and driving means including an impeller fan between said filter and the inlet of said suction fan for producing relative rotation between said filter and said nozzle.

3. In a vacuum cleaner, a dust collecting chamber, a suction fan having an inlet and an outlet with the inlet communicating with said dust collecting chamber, a filter interposed between said chamber and the inlet of said fan, a filter cleaner nozzle within said chamber arranged to direct a jet of air against a portion of the surface of said filter facing said chamber, said filter and said nozzle being mounted for relative rotation so that the jet of air from the nozzle traverses the surface of the filter, driving means including an impeller fan between said filter and the inlet of said suction fan for producing relative rotation between said filter and said nozzle, and reduction gearing interposed in said driving means to reduce the speed of such relative rotation.

4. In a vacuum cleaner, a dust collecting chamber, a suction fan having its inlet connected to said chamber, a stationary filter interposed between the fan inlet and said chamber and having a surface facing said chamber against which the air impinges in flowing from the chamber to the fan and upon which dust accumulates during operation of the cleaner, and a filter cleaner comprising an air pressure nozzle within said chamber having an elongated outlet adjacent to and directed toward and at an inclination to the surface of the filter facing said chamber, said nozzle being mounted for traversing movement with respect to said filter surface.

5. In a vacuum cleaner, a dust collecting chamber, a suction fan having its inlet connected to said chamber, a stationary filter interposed between the fan inlet and said chamber and having a surface facing said chamber against which the air impinges in flowing from the chamber to the fan and upon which dust accumulates during operation of the cleaner, a filter cleaner comprising an air pressure nozzle within the chamber and adjacent the filter surface facing said chamber, said nozzle having an elongated outlet adjacent the filter surface and positioned to direct an air jet against said surface in a direction at an inclination to said surface, said nozzle being mounted for traversing movement with respect to the filter surface, and a conduit receiving air under pressure from said fan and delivering the same to said nozzle.

6. In a vacuum cleaner, a dust collecting chamber, a suction fan having its inlet connected to said chamber, a stationary filter interposed between the fan inlet and said chamber and having a surface facing said chamber against which the air impinges in flowing from the chamber to the fan and upon which dust accumulates during operation of the cleaner, and a filter cleaner in the form of a pressure air nozzle mounted for traversing movements with respect to the filter on the side thereof facing said chamber, said nozzle having an elongated outlet adjacent the filter surface and positioned to direct an air stream against said filter surface at an inclination to said surface to dislodge material adhering to said surface.

7. In a vacuum cleaner, a tank comprising a bottom section forming a dust receptacle and having an inlet and a cover section having an outlet, a suction fan mounted on the cover section and having its inlet connected to said cover outlet, a conical downwardly tapering filter attached to said cover around said outlet, and a filter cleaner comprising a nozzle connected to said fan to receive air under pressure therefrom and mounted to rotate about the axis of the filter cone, said nozzle having an elongated upwardly inclined portion closely underlying the surface of the conical filter and having an outlet for directing an air stream against the filter surface.

8. In a vacuum cleaner, a tank comprising a bottom section forming a dust receptacle and having an inlet and a cover section having an outlet, a suction fan mounted on the cover section and having its inlet connected to said cover outlet, a conical downwardly tapering filter attached to said cover around said outlet, a filter cleaner comprising a nozzle connected to said fan to receive air under pressure therefrom and mounted to rotate about the axis of the filter cone, said nozzle having an elongated upwardly inclined portion closely underlying the surface of the conical filter and having an outlet for directing an air stream against the filter surface, a motor driven by air moved by said fan, and a driving connection from said motor to said nozzle.

9. In a vacuum cleaner, a tank comprising a bottom section forming a dust receptacle and having an inlet and a cover section having an outlet, a suction fan mounted on the cover section and having its inlet connected to said cover outlet, a conical downwardly tapering filter attached to said cover around said outlet, a bearing member carried by the filter at its apex, a vertically disposed tubular shaft journaled in said bearing member, an upwardly inclined nozzle attached to said shaft at its lower end and having an outlet directed toward the conical surface of the filter, said nozzle communicating with the interior of said shaft, and a conduit connected to the interior of said shaft through said bearing and with said fan to receive air under pressure therefrom.

10. In a vacuum cleaner, a tank comprising top and bottom cup-shaped sections, the top section having a centrally disposed outlet and the bottom section forming a dust receptacle and having a lateral inlet, a suction fan mounted on the top section and positioned to draw air through said central outlet, a downwardly tapering conical filter mounted in said cover coaxially with and beneath said outlet, a bearing member at the apex of the filter cone, a housing carried by said bearing member above the filter, a shaft journaled in said bearing member and extending below the filter, an impeller rotatably mounted in said housing and positioned outside said housing and beneath said outlet opening, gearing in said housing providing a driving connection from said impeller to said shaft, and a filter cleaning element carried by said shaft.

JAMES B. KIRBY.

(References on following page)

REFERENCES CITED

The following references are of record in the file of this patent:

UNITED STATES PATENTS

| Number | Name | Date |
|---|---|---|
| 755,199 | Wellman | Mar. 22, 1904 |
| 1,134,294 | Supanz | Apr. 6, 1915 |
| 1,455,834 | Diehl | May 22, 1923 |
| 1,493,789 | Mullen | May 13, 1924 |
| 1,957,307 | Ohlsen | May 1, 1934 |
| 2,134,649 | Will et al. | Oct. 25, 1938 |
| 2,198,568 | Yonkers | Apr. 23, 1940 |
| 2,296,359 | Martinet | Sept. 22, 1942 |
| 2,400,217 | White | May 14, 1946 |
| 2,444,809 | Cranmer | July 6, 1948 |

FOREIGN PATENTS

| Number | Country | Date |
|---|---|---|
| 148,799 | Great Britain | Oct. 10, 1921 |
| 353,837 | Great Britain | Feb. 1, 1929 |
| 377,735 | Germany | June 26, 1923 |
| 110,391 | Austria | Mar. 15, 1928 |